(12) United States Patent
Jones et al.

(10) Patent No.: US 7,565,603 B1
(45) Date of Patent: Jul. 21, 2009

(54) REPRESENTING STYLE INFORMATION IN A MARKUP LANGUAGE DOCUMENT

(75) Inventors: Brian Jones, Redmond, WA (US); Anthony Douglas Krueger, Woodinville, WA (US); Marcin Sawicki, Kirkland, WA (US); Robert Little, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 143 days.

(21) Appl. No.: 10/731,518

(22) Filed: Dec. 9, 2003

Related U.S. Application Data (63) Continuation-in-part of application No. 10/187,060, filed on Jun. 28, 2002.

(51) Int. Cl.
*G06F 17/00* (2006.01)
(52) U.S. Cl. ............ 715/236; 715/249; 707/102
(58) Field of Classification Search ........... 715/513, 715/501.1, 523, 522, 236, 234, 249; 707/102, 707/3, 101, 10, 104.1
See application file for complete search history.

(56) References Cited

U.S. PATENT DOCUMENTS

| | | | |
|---|---|---|---|
| 4,751,740 A | 6/1988 | Wright | 382/180 |
| 4,864,501 A | 9/1989 | Kucera et al. | 704/8 |
| 4,866,777 A | 9/1989 | Mulla et al. | 704/206 |
| 5,185,818 A | 2/1993 | Warnock | 382/54 |
| 5,295,266 A | 3/1994 | Hinsley et al. | 718/101 |
| 5,557,722 A | 9/1996 | DeRose et al. | 715/513 |
| 5,579,466 A | 11/1996 | Habib et al. | 715/529 |
| 5,586,241 A | 12/1996 | Bauermeister et al. | 395/167 |
| 5,781,714 A | 7/1998 | Collins et al. | 395/171 |
| 5,787,451 A | 7/1998 | Mogilevsky | 715/533 |
| 5,881,225 A | 3/1999 | Worth | 726/17 |
| 5,895,476 A | 4/1999 | Orr et al. | 707/517 |
| 6,023,714 A * | 2/2000 | Hill et al. | 715/513 |
| 6,031,989 A * | 2/2000 | Cordell | 717/109 |
| 6,044,387 A | 3/2000 | Angiulo et al. | 715/533 |
| 6,092,068 A | 7/2000 | Dinkelacker | 707/100 |
| 6,119,136 A | 9/2000 | Takata et al. | 715/513 |

(Continued)

FOREIGN PATENT DOCUMENTS

EP 1230566 8/2002

OTHER PUBLICATIONS

Harold, Rusty Elliotte, "XML Bible," IDG Books Worldwide, Inc., 1999, title page, copyright page, and pp. 1-15, 95-132, 191-200, 333-336, 352-360, and 433-567.*

(Continued)

*Primary Examiner*—Laurie Ries
(74) *Attorney, Agent, or Firm*—Merchant & Gould, P.C.

(57) ABSTRACT

An application has its own namespace or namespaces and a schema, or a set of schemas, which can be used by applications to generate and/or validate documents in a unique format. The application can uniquely define the format (and properties) of styles of data in a document such that the document is represented in a native format. The document can be stored externally as a markup language file in accordance with the schema of the application. When the format is stored in a markup language, other applications can validate the document stored in accordance with the native format. The other applications can represent the styles in accordance to the degree to which they are aware of the unique properties of the application used to generate the document.

17 Claims, 5 Drawing Sheets

U.S. PATENT DOCUMENTS

| | | | | |
|---|---|---|---|---|
| 6,141,754 | A | 10/2000 | Choy | 726/1 |
| 6,182,029 | B1 | 1/2001 | Friedman | 704/9 |
| 6,209,124 | B1 | 3/2001 | Vermeire et al. | 717/114 |
| 6,230,173 | B1* | 5/2001 | Ferrel et al. | 715/513 |
| 6,233,592 | B1 | 5/2001 | Schnelle et al. | 715/513 |
| 6,249,794 | B1 | 6/2001 | Raman | 715/500 |
| 6,336,124 | B1 | 1/2002 | Alam et al. | 715/523 |
| 6,397,232 | B1* | 5/2002 | Cheng-Hung et al. | 715/523 |
| 6,507,856 | B1* | 1/2003 | Chen et al. | 715/513 |
| 6,507,857 | B1* | 1/2003 | Yalcinalp | 715/513 |
| 6,519,617 | B1* | 2/2003 | Wanderski et al. | 715/513 |
| 6,535,896 | B2* | 3/2003 | Britton et al. | 715/523 |
| 6,538,673 | B1* | 3/2003 | Maslov | 715/853 |
| 6,613,098 | B1 | 9/2003 | Sorge et al. | 715/503 |
| 6,675,353 | B1 | 1/2004 | Friedman | 715/513 |
| 6,697,999 | B1 | 2/2004 | Breuer et al. | 715/517 |
| 6,725,423 | B1* | 4/2004 | Muramoto et al. | 715/513 |
| 6,725,426 | B1* | 4/2004 | Pavlov | 715/523 |
| 6,754,648 | B1 | 6/2004 | Fittges et al. | 707/1 |
| 6,763,500 | B2 | 7/2004 | Black et al. | 715/513 |
| 6,785,685 | B2 | 8/2004 | Soetarman et al. | 707/101 |
| 6,799,299 | B1* | 9/2004 | Li et al. | 715/513 |
| 6,829,570 | B1 | 12/2004 | Thambynayagam et al. | 703/10 |
| 6,829,745 | B2* | 12/2004 | Yassin et al. | 715/513 |
| 6,845,483 | B1 | 1/2005 | Carroll | 715/513 |
| 6,886,115 | B2 | 4/2005 | Kondoh et al. | 714/52 |
| 6,918,086 | B2 | 7/2005 | Rogson | 715/513 |
| 6,928,610 | B2 | 8/2005 | Brintzenhofe et al. | 715/517 |
| 6,938,204 | B1* | 8/2005 | Hind et al. | 715/515 |
| 6,941,510 | B1 | 9/2005 | Ozzie et al. | 715/513 |
| 6,945,898 | B2 | 9/2005 | Szuba | 715/542 |
| 6,968,503 | B1* | 11/2005 | Chang et al. | 715/526 |
| 6,996,772 | B2 | 2/2006 | Justice et al. | 715/513 |
| 7,028,009 | B2 | 4/2006 | Wang et al. | 705/51 |
| 7,257,772 | B1 | 8/2007 | Jones et al. | 715/530 |
| 7,275,209 | B1 | 9/2007 | Jones et al. | 715/513 |
| 7,376,650 | B1 | 5/2008 | Ruhlen | 707/6 |
| 7,389,473 | B1 | 6/2008 | Sawicki et al. | 715/225 |
| 2001/0014900 | A1 | 8/2001 | Brauer et al. | 707/513 |
| 2001/0032217 | A1 | 10/2001 | Huang | 707/513 |
| 2002/0087702 | A1 | 7/2002 | Mori | 709/223 |
| 2002/0091725 | A1 | 7/2002 | Skok | 707/501.1 |
| 2002/0116420 | A1 | 8/2002 | Allam et al. | 715/273 |
| 2002/0124115 | A1 | 9/2002 | McLean et al. | 709/310 |
| 2002/0184189 | A1 | 12/2002 | Hay et al. | 707/1 |
| 2003/0007014 | A1 | 1/2003 | Suppan et al. | 345/853 |
| 2003/0018668 | A1 | 1/2003 | Britton et al. | 707/513 |
| 2003/0101416 | A1 | 5/2003 | McInnes et al. | 715/513 |
| 2003/0135584 | A1 | 7/2003 | Roberts et al. | 709/218 |
| 2003/0163784 | A1 | 8/2003 | Daniel et al. | 715/513 |
| 2003/0167444 | A1 | 9/2003 | Zorc | 715/513 |
| 2003/0231626 | A1 | 12/2003 | Chuah et al. | 370/389 |
| 2004/0073871 | A1 | 4/2004 | Giannetti | 715/513 |
| 2004/0098320 | A1 | 5/2004 | Mitsuhashi et al. | 705/27 |
| 2004/0194035 | A1 | 9/2004 | Chakraborty | 715/531 |
| 2004/0205553 | A1 | 10/2004 | Hall et al. | 715/531 |
| 2004/0210818 | A1 | 10/2004 | Jones et al. | 715/500 |
| 2005/0102265 | A1 | 5/2005 | Jones et al. | 707/1 |
| 2005/0108198 | A1 | 5/2005 | Jones et al. | 707/1 |
| 2005/0108278 | A1 | 5/2005 | Jones et al. | 707/102 |

OTHER PUBLICATIONS

Harold, Rusty Elliotte, "XML Bible," IDG Books Worldwide, Inc., 1999, (previously provided to Applicant).*

Cagle, et al., "Professional XSL," Wrox Press Ltd., 2001, cover and copyright pages and pp. 9-21.*

Rohr, Paul, "RE: Styles Again", downloaded from http://www.abisource.org/mailinglists/abiword-dev/01/May/0561.html, May 2001, pp. 1-2.*

Ayers, I., "AbiWord's Potential", LInux Gazette, Issue 43, Jul. 1999, last downloaded by the Examiner in Dec. 20, 2005 from www.linuxgazette.com/issue43/ayers.html, downloaded pp. 1-4.*

Y. Ishitani, "Document Transformation System from Papers to XML Data Based on Pivot XML Document Method", IEEE Computer Society, Seventh International Conference on Document Analysis and Recognition, 6 pgs., Aug. 3-6, 2003.

"AbiWord", http://en.wikipedia.org/wiki/AbiWord>, Oct. 19, 2005, 2 pgs.

"Case Study: Converting Word into XML", YAWC Pro, 1 pg.

"Case Study: Maintaining Websites with Microsoft Word", YAWC Pro., 1 pg.

"Case Study: Publishing Content to the Web and Mobile Phones", YAWC Pro., 1 pg.

"Case Study: Typesetting XML with QuarkXPress", YAWC Pro, 1 pg.

"Creating DocBook Documents", Aug. 2, 2001, pp. 1 and 16, http://web.archive.org/web/20020615124747/www.docbook.org/tdg/en/html/ch02.html.

"Introduction to AbiWord", http://web.archive.org/web/20010608211934/www.abisource.com/help/en-US/index.htm, Jun. 8, 2001, 3 pgs.

"Introduction to XML" University of Washington Computing and Communications, copyright 1999, on the Internet as of Jun. 24, 2001, downloaded from http://web.archive.org/web/20010624123830/http://www.washington.edu/computing/training/540/xml_well.html, 1 pg.

"Star Office XML File Format Working Draft", Sun Microsystems, Inc., pp. 57, 59.

"Tei, The XML Version of the TEI Guidelines" Text Encoding Initiative [TEI] Consortium, Copright 2001, with Introductory Note, dated Mar. 2002, downloaded from: http://www.tei-c.org.uk/Drafts/P4/driver.xml, on Nov. 25, 2006, downloaded pp. 1-93.

"XML Schema - Lecture 4 Notes", downloaded from http://www.cs.rpi.edu/~puninj/XMLJ/classes/class4/all.html, Nov. 21, 2001, pp. 1-14.

"XML Schema for AbiWord Markup Language", downloaded from http://www.abisource.com/awml.xsd, May 27, 2000, pp. 1-3.

"XML Schema for AbiWord Markup Language", http://www.abisource.com/awml.xsd>, Apr. 27, 2000, 3 pgs.

"XML Schema Part 1: Structures", W3C Recommendation, May 2, 2001, downloaded from http://wwww.w3.org/TR2001/REC-xmlschema-1-20010502/, pp. 1-19.

"YAWC Pro 1.0 Installation & User Guide", pp. 1-11.

Alshuler, Liora, "Getting the Tags In: Vendors Grapple With XML-Authoring, Editing and Cleanup", Seybold Report on Internet Publishing, vol. 5, No. 6, Feb. 2001, pp. 1-6.

Altamura et al., "Transforming paper documents into XML format with WISDOM++", Nov. 7, 2000, IJDAR, pp. 6-12.

Altova Inc. & Altova GmbH, =XML Spy 4.0 Manualx copyright 1998-2001, Sep. 10, 2001, downloaded from: http://www.altova.com/download.sub.--archive.html and link, pp. 18-286.

Altova Inc. & Altova GmbH, "XML Spy 4.0 Manual," copyright 1998-2001, published Sep. 9, 2001, pp. 1-401.

Case Western Reserve University (CRWU), "Introduction to HTML", Case Western Reserve University and Eric A. Meyer, Mar 4, 2000, downloaded from web.archive.org/web/20000304042655/http://www.cwru.edu/help/introHTML/toc.html, downloaded pp. 1-157.

Castro, E., "XML for the World Wide Web, Visual Quickstart Guide", Peachpit Press, 2001, 1 p. 245.

Castro, Elizabeth, "XML for the World Wide Web" Published by Peachpit Press, 2001, pp. 182- 184.

Chipr, "AbiWord - Word Processing For Everyone", http://www.kuro5hin.org/?op=displaystory;sid=2002/4/22/22406/9615>, Apr. 23, 2002, 8 pgs.

Chiyoung Seo et al.; An efficient inverted index technique for XML documents using RDBMS; Received Jan. 16, 2002; Information and Software Technology 45 (2003), Jun. 1, 2002; pp. 11-22.

Dan Franks, "Crowd Control (Secrets)", Jun. 1, 2002, MacWorld, vol. 19, No. 6, p. 102.

Danny Heijl; The Delphi XML SAX2 Component & MSXML 3.10; Dr. Dobb's Journal, Sep. 2001; pp. 42-54.

David Eisenberg, "Using XSL Formatting Objects", Jan. 17, 2001, pp. 1a and 1, http://www.xml.com/pub/a/2001/01/17/xsl-fo/index.html?page=2.

Dzuba, Vassili, "Majx 1.0: A Word to XML Converter", donwloaded from http://xml.coverpages.org/majx10Ann.html, Oct. 6, 1998, pp. 1-2.

Glenn, Walter, "Word 2000 in a Nutshell", O'Reilly & Associates, inc., Aug. 2000, Cover, copyright, and Sections 16.4 and 16.3, downloaded pp. 1-8.

Harold, Rusty Elliotte, "XML Bible", IDG Books Worldwide, 1999, pp. 369-388.

HV, Ltd., "WorX Standard Edition (SE) 'XML Authoring Made Easy'," HyperVision, Ltd., published on the Internet as of Jun. 3, 2001 as a PDF file linked to http://www.archive.org/web/20010603152210/www.hvltd.com/default.asp?name=-information/xml/worxseOverview.xml&display=information/xsl/defualt.xsl, pp. 1-9 - No Copy Available, Dead Link.

HyperVision, Ltd., "WorX 2.1 Authoring Guide for XML 2001", Sep. 2001, downloaded from http://www.xmlconference.org/xmlusa/2001/XML2.1AuthoringGuideforXML2001.pdf, pp. 1-29.

Infinity-Loop, Web Site Home Page, re: infinity-loop, Apr. 20, 2001, 1 pg.

J. Geigel et al., "Automatic Page Layout Using Genetic Algorithms for Electronic Alburning", Proceedings of Electronic Imaging, Jan. 21-26, 12 pgs.

James E. Powell, "Microsoft Office Beta 2 on the Horizon", WinMag.com, Nov. 3, 2000.

Jeong, Euna et al., "Semistructured Data: induction of Integrated View for XML Data With Heterogeneous DTDs", Proceedings of the Tenth International Conference on Information and Knowledge Mangement, Oct. 2001, pp. 151-158.

John Lombardi, "Word Pro Excels at 'Team' Work", Info World, Jan. 8, 1996, p. 86.

Jon Bosak, "XML: The Universal Publishing Format", 1998, pp. 1-2.

Jon Udell, "Getting Traction", Jul. 12, 2002.

JP Morgenthal; XML for Data Integration; EAI Journal, Oct. 2001; pp. 13-14, 16.

Juran, J., "MML: The Modest Markup Language", Oct. 22, 2000, downloaded pp. 1-15.

Kathy Yakal, "Elegant Document Distribution", Computer Shopper, Nov. 1995, pp. 1-2.

Klink et al., "Document Structure Analysis based on Layout and Textual Features", Sep. 25, 2000, DFKI, pp. 1a, 3, 4 and 11.

Lemay, Laura, "Teach Yourself Web Publishing with HTML 4 in 14 days, Professional Reference Edition", Second Edition, Sams.net Publishing, 1997, pp. 778-789.

Liberty, J. et al., "XML Web Documents from Scratch", Que Corporation, Mar. 10, 2000, cover, copyright, chapters 1 and 2, downloaded pp. 1-16.

Liefke, Harmut et al., "Xmill: An Efficient Compressor for XML Data", SCM SIGMOD Record, vol. 29, Issue 2, May 2000, pp. 153-164.

M. Fernandez and S. Amer-Yahia; Advanced Technology Seminar 2--Techniques for Storing XML; pp. 323, 774-776.

M. Kirjavaninen, "XML Browsers", http://mia.ece.uic.edu/~papers/WWW/MultimediaStandards/XML—browsers.pdf, last accessed Mar. 14, 2005, 16 pgs.

M. Schrage, "Proxima, A presentation-oriented editor for structured documents", IPA, ISBN 12-345-6789-0, Jun. 4, 1973, pp. 1-186.

Mansfield, Ron, "Mastering Word 97 Fourth Edition", 1997, Sybex, pp. 269-270, 412, 449-457, 985-986, 1010-1011, 1028-1029, 1031-1034.

Mathias Neumuller and John N. Wilson; Improving XML Processing Using Adapted Data Structures; Oct. 7-10, 2002; pp. 206-220.

McGrath, Robert, "Representing "Binary" Data in XML", downloaded from http://ndf.ncsa.uiuc.edu/HDF5/XML/tools/binary.html, Mar. 2001, pp. 1-4.

Michael Champion; Storing XML in Databases; EAI Journal, Oct. 2001; pp. 53-55.

Michael Floyd, "Debugging XML Applications", Aug. 2000, www.webtechniques.com, pp. 79-81.

Microsoft, "Microsoft Word 2000", 1999, Microsoft, Screenshots 1-7, pp. 1-2.

Milbery, J., "WorX SE", XML Journal, published Feb. 4, 2001, downloaded from http://xml.sys-con.com/read/40149.htm, downloaded pp. 1-5.

Moseley, Lonnie et al., "Mastering Microsoft Office 97 Professional Edition", Sybex, 1996, pp. 87, 94-98, 103-105, 165-179, 1114-1115.

Munro, J., "StarOffice 6.0 Lives Up to its Name", PCMAG.com, May 23, 2002, www.pcmag.com/print_article2/0,1217,a=27287,00.asp,downloaded pp. 1-3.

Novak, U. et al., "Experimental XSLT Processcor for Objects", Proceedings of the JASTED Int'l Conf. On Applied Informatics, Feb. 2002, pp. 277-282.

Oliver Meyer, "Creating Validated XML Documents on the Fly Using MS Word", Oct. 20, 2002, pp. 113-121.

Patrick Marshall, "DocuShare 2.0 Makes Web Document Management Work", Sep. 27, 1999.

Pradeep Jain; "Creating XML from Microsoft Word: The Challenges", Dec. 3-8, 2000, pp. 136-144.

Ray, Erik T., "Learning XML", O'Reilly & Associates, Inc., Jan. 2001, cover, copyright, and Chapter 5 downloaded pp. 1-25.

Robert D. Cameron; REX:XML shallow parsing with regular expressssions; Markup Languages; Theory & Practice 1.3, Summer 1999; pp. 61-68.

Rodriguez, M., "XML: Twig", xmltwig.com,copyright 2003, downloaded pp. 1-4, web.archive.org/web/20030422002120/http://www.xmltwig.com/xmltwig/tools/xml_spellcheck.

Rusty Elliotte, "XML Bible", IDG Books Worldwide, Inc., 1999, pp. 1-12, 120-127, 333-335.

Schmelzer, Ronald, "ZapThink Briefing Note - HyperVision - Automating Valid XML Document Creation Within Microsoft Word", ZapThink LLC, Feb. 8, 2002, pp. 1-6.

Scott Boggan and Micael De Laurentis, A System for Matching static or distortable fonts; May 1994; pp. 1-9; http://www.byte.com/art/940/sec12/art1.htm.

Sihem Amer-Yahia, Mary Fernandez, Divesh Srivastava and Yu Xu; PIX: A System for Phrase Matching in XML Documents: A Demonstartion; 2003 IEEE; pp. 774-776.

Simplson, J., "Just XML", Prentice Hall, Second Edition, 2001, cover, copyright page, and p. 31.

Skylar, D., "The Annotated Rainbow DTD, Rainbow Version 2.5", Electronic Book Technologies, Inc., Feb. 8, 1995, pp. 1-12.

Star Office XML File Format Wokring Draft, Sun, Microsystems, Inc., pp. 1-19, and 196.

Sun Microsystems, "StarOffice XML File Format Working Draft", Jan. 2001, Draft 10, pp. 19, 89, 142, and 234, http://web.archive.org/web/20010603030227/xml.openoffice.org/xml_specification_draft.pdf.

Sun Microsystems, "The OpenOffice.org Source Project", Sun Microsystems, Inc., 2000, downloaded pp. 1-34.

Surajit Chaudhuri and Kyuseok Shim; Storage and Retrieval of XML Data using Relational Databases; Advanced Technology Seminar 4; Abstract; Mar. 5, 2003; p. 802.

Tetrasix, "Welcome to Tetrasix Web Site", re:MajiX, Apr. 18, 2001, downloaded pp. 1-3.

Torsten Grabs et al.; XMLTM: Efficient Transaction Management for XML Documents; CIKM'02, Nov. 4-9, 2002; pp. 142-152.

Ullas Nambiar et al.; Efficient XML Data Management: An Analysis; EC-Web 2002, LNCS 2455; pp. 87-98.

Unicode Inc., "Unicode Technical Reports", Sep. 21, 2002, pp. 1, 2, 638, 642, and 644.

University of Georgia Center for Continuing Education, "Exploring the World-Wide Web, Hypertext Markup Language", Feb. 24, 1999, downloaded pp. 1-7.

Uros Novak et al., "Experimental XSLT Processor for Objects", Proceedings of the IASTED International Conference, Applied Informatics, Feb. 18-21, 2002, pp. 277-282.

V. Turau, "Making legacy data accessible for XML applications", University of Applied Sciences, Department of Compter Science, Wiesbaden, Germany, 1999, pp. 1-11.

Volkan Atalay and Erkan Arslan; An SGML Based Viewer for Form Documents; 1999 IEEE Jul. 1999; pp. 201-204.

W. Wadge, "Intentional Markup Language", Proceedings of the Third International Workshop, DCW 2000, Quebec City, Canada, Jun. 19-21, 2000, pp. 82-89.

W3C, "XML Schema Part 0: Primer", W3C Recommendation, May 2, 2001, downloaded pp. 1-67.

W3C, "XML Schema Requirements", W3C Note, Feb. 15, 1999, downloaded from www.w3.org/TR/NOTE-xml-schema-req, pp. 1-5.

W3C, Fonts, Jan. 24, 2001, W3C, pp. 1-4, http://web.archive.org/web/20010124044900/ ttp://www.13.w3.org/TR/REC-CSS2/fonts.html#matching.

Walther, P., "XML Dokumente in Microsoft Word mit neuem produkt der struktur AG Kostenlos testen", http:www.contentmanager.de/magazine/news_h2695_xml_in_microsoft_word_mit_neuem.html>, Jun. 5, 2002, 2 pgs.

Watchorn, H. et al., "Word and XML: Making the 'Twain Meet'", XML Europe 2001, papers, May 2001, downloaded pp. 1-11.

WayBack Machine, Feb. 15, 2006, p. 1, http://web.archive.org/web/*/http://www.w3.org/TR/REC-CSS2/fonts.html - No Copy Available, Dead Link.

Wen, Howard, "AbiWord: Open Source's Answer to Microsoft Word", Linux Dev Center, downloaded from http://www.linuxdevcenter.com/lpt/a/1636, Mar. 14, 2002, pp. 1-3.

White, B. et al., "Standard Strucural Elements" from "Web Content Accessibility Tips and Tricks", May 1, 2001, downloaded pp. 1-4.

Xin Zhang et al.; Clock: Synchronizing Internal Relational Storage with External XML Documents; 2001 IEEE Jun. 2001; pp. 111-118.

Xmetal 1.0, Webreference.com, Oct. 29, 1999, downloaded pp. 1-2, www.webreference.com/html/watch/xmetal/5.html.

XML Workshop Ltd., "Word to XML Converters", Mar. 7, 2003, downloaded pp. 1-2.

YAWC Pro, "Welcome to YAWC Pro", Dec. 11, 2001, 1 pg.

Castro, Elizabeth, "XML for the World Wide Web: Visual QuickStart Guide," Oct. 23, 2000, Peachpit Press, pp. 1-6.

DevX Staff, "Twelve Dynamic HTML Lessons," downloaded from http://devx.com/projectcool/Article/18103/1763, published Jan. 1, 2000, pp. 1-3.

Linss, Peter, "CSS Namespace Enhancements (proposal)", Jun. 1999, W3C, pp. 1-7.

Mansfield, Ron, "Mastering Word 97 Fourth Edition", 1997, Sybex, pp. 221-222, 271-273,278-280, 283-284, 325-330, 539-540, 1015.

Meyer, Eric, "Cascading Style Sheets: Html and CSS", May 2000, O'Rielly, pp. 1-17.

O'Rielly, "HTML & XHTML The Definitive Guide," 4th Edition, Copyright 2000, pp. 1-6, http://orielly.jungles.ru/webdesign/xhtml/ch16_03.htm.

Sun Microsystems, "StarOffice XML File Format Wokring Draft", Jan. 2001, Draft 10, pp. 48, 49, 51, 54-58.

XHTML Examples, "XHTML explained -- XHTML Examples," downloaded from http://web.archive.org/web/20020603200919/http://www.javascriptkit.com/hotto/xhtml_intro4.Shtml, published Jun. 3, 2002, pp. 1-3.

* cited by examiner

```
                                           ┌─ 300
                  ┌─310
<w:styles>
    <w:versionOfBuiltInStylenames w:val="4" />
    <w:latentStyles w:defLockedState="off" w:latentStyleCount="156" />
    <w:style w:type="paragraph" w:default="on" w:styleId="Normal">
        <w:name w:val="Normal" />
        <w:rsid w:val="00A82672" />                              320
        <w:rPr>
            <wx:font wx:val="Times New Roman" />
            <w:sz w:val="24" />
            <w:sz-cs w:val="24" />
            <w:lang w:val="EN-US" w:fareast="EN-US" w:bidi="AR-SA" />
        </w:rPr>
    </w:style>
    <w:style w:type="character" w:default="on" w:styleId="DefaultParagraphFont">
        <w:name w:val="Default Paragraph Font" />
        <w:semiHidden />
    </w:style>
    . . .
</w:styles>  ┌─330
<w:body>
    <wx:sect>
        <w:p>
            <w:r>
                <w:t>Hello</w:t>
            </w:r>
        </w:p>          340
        <w:sectPr>
            . . .
        </w:sectPr>
    </wx:sect>
</w:body>
```

*Fig. 3*

```
                                                        ┌─ 400
                    ┌─ 410
<w:styles>
    <w:versionOfBuiltInStylenames w:val="4" />
    <w:latentStyles w:defLockedState="off" w:latentStyleCount="156" />
    <w:style w:type="paragraph" w:default="on" w:styleId="Normal">
        <w:name w:val="Normal" />
        <w:rsid w:val="00A82672" />                              420
        <w:rPr>
            <wx:font wx:val="Times New Roman" />
            <w:sz w:val="24" />
            <w:sz-cs w:val="24" />
            <w:lang w:val="EN-US" w:fareast="EN-US" w:bidi="AR-SA" />
        </w:rPr>
    </w:style>
    <w:style w:type="character" w:default="on" w:styleId="DefaultParagraphFont">
        <w:name w:val="Default Paragraph Font" />
        <w:semiHidden />
    </w:style>                                      ┌─ 430
    <w:style w:type="paragraph" w:styleId="MyStyle">
        <w:name w:val="MyStyle" />
        <w:basedOn w:val="Normal" />
        <w:rsid w:val="00A82672" />
        <w:pPr>
            <w:pStyle w:val="MyStyle" />
        </w:pPr>
        <w:rPr>
            <wx:font wx:val="Times New Roman" />
            <w:color w:val="800000" />
        </w:rPr>
    </w:style>
    . . .
</w:styles>   ┌─ 440
<w:body>
    <wx:sect>
        <w:p>
            <w:r>
                <w:t>Plain</w:t>
            </w:r>         450
        </w:p>
        <w:p>                         ┌─ 460
            <w:pPr>
                <w:pStyle w:val="MyStyle" />
            </w:pPr>
            <w:r>
                <w:t>My special sentence</w:t>
            </w:r>
        </w:p>            470
        <w:sectPr>
            . . .
        </w:sectPr>
    </wx:sect>
</w:body>
```

REPRESENTING STYLE INFORMATION IN A MARKUP LANGUAGE DOCUMENT

RELATED APPLICATIONS

This patent application is a continuation-in-part application under 35 United States Code § 120 of U.S. patent application Ser. No. 10/187,060 filed on Jun. 28, 2002, which is incorporated herein by reference. An exemplary schema in accordance with the present invention is disclosed in a file entitled Appendix.txt in a CDROM attached to an application entitled "Mixed Content Flexibility," Ser. No. 10/726,077, filed Dec. 2, 2003, which is hereby incorporated by reference in its entirety.

COMPUTER PROGRAM LISTING APPENDIX

A computer listing is included in a Compact Disc appendix in the attached CD ROM (quantity of two) in IBM-PC using MS-Windows operating system, containing file Appendix-.txt, created on Dec. 29, 2006, containing 12,288 bytes (Copy 1 and Copy 2) and is hereby incorporated by reference in its entirety.

BACKGROUND OF THE INVENTION

Markup Languages have attained wide popularity in recent years. One type of markup language, Extensible Markup Language (XML), is a universal language that provides a way to identify, exchange, and process various kinds of data. For example, XML is used to create documents that can be utilized by a variety of application programs. Elements of an XML file have an associated namespace and schema.

In XML, a namespace is a unique identifier for a collection of names that are used in XML documents as element types and attribute names. The name of a namespace is commonly used to uniquely identify each class of XML document. The unique namespaces differentiate markup elements that come from different sources and happen to have the same name.

XML Schemata provide a way to describe and validate data in an XML environment. A schema states what elements and attributes are used to describe content in an XML document, where each element is allowed, what types of text contents are allowed within it and which elements can appear within which other elements. The use of schemata ensures that the document is structured in a consistent manner. Schemata may be created by a user and generally supported by an associated markup language, such as XML. By using an XML editor, the user can manipulate the XML file and generate XML documents that adhere to the schema the user has created. XML documents may be created to adhere to one or more schemata.

The XML standard is considered by many as the ASCII format of the future, due to its expected pervasiveness throughout the hi-tech industry in the coming years. Recently, some word-processors have begun producing documents that are somewhat XML compatible. For example, some documents may be parsed using an application that understands XML. However, much of the functionality available in word processor documents is not currently available for XML documents.

SUMMARY OF THE INVENTION

The present invention is generally directed towards a method for representing style information in a markup language (ML) document such as an XML document. Styles provide a method to package a set of formatting (e.g., character formatting, paragraph formatting, table formatting, etc.) under a single user selection that may be used redefined throughout a document.

More particularly, the present invention relates to representing style information in ML so that applications capable of reading a given ML file format, but running in environments where the style information has not been installed, are able to still render the styles. The ML document may be manipulated on a server or anywhere even when the application creating the ML document is not present. Style information (i.e., properties) is saved in a markup language (ML) document without data loss, while allowing the style information to be parsed by ML-aware applications and to be read by ML programmers.

DETAILED DESCRIPTION OF THE PREFERRED EMBODIMENT

Throughout the specification and claims, the following terms take the meanings explicitly associated herein, unless the context clearly dictates otherwise.

The terms "markup language" or "ML" refer to a language for special codes within a document that specify how parts of the document are to be interpreted by an application. In a word-processor file, the markup language specifies how the text is to be formatted or laid out, whereas in a particular customer schema, the ML tends to specify the text's meaning according to that customer's wishes (e.g., customerName, address, etc). The ML is typically supported by a word-processor and may adhere to the rules of other markup languages, such as XML, while creating further rules of its own.

The term "element" refers to the basic unit of an ML document. The element may contain attributes, other elements, text, and other building blocks for an ML document.

The term "tag" refers to a command inserted in a document that delineates elements within an ML document. Each element can have no more than two tags: the start tag and the end tag. It is possible to have an empty element (with no content) in which case one tag is allowed.

The content between the tags is considered the element's "children" (or descendants). Hence, other elements embedded in the element's content are called "child elements" or "child nodes" or the element. Text embedded directly in the content of the element is considered the element's "child text nodes". Together, the child elements and the text within an element constitute that element's "content".

The term "attribute" refers to an additional property set to a particular value and associated with the element. Elements may have an arbitrary number of attribute settings associated with them, including none. Attributes are used to associate additional information with an element that will not contain additional elements, or be treated as a text node.

Illustrative Operating Environment

Figure 1:
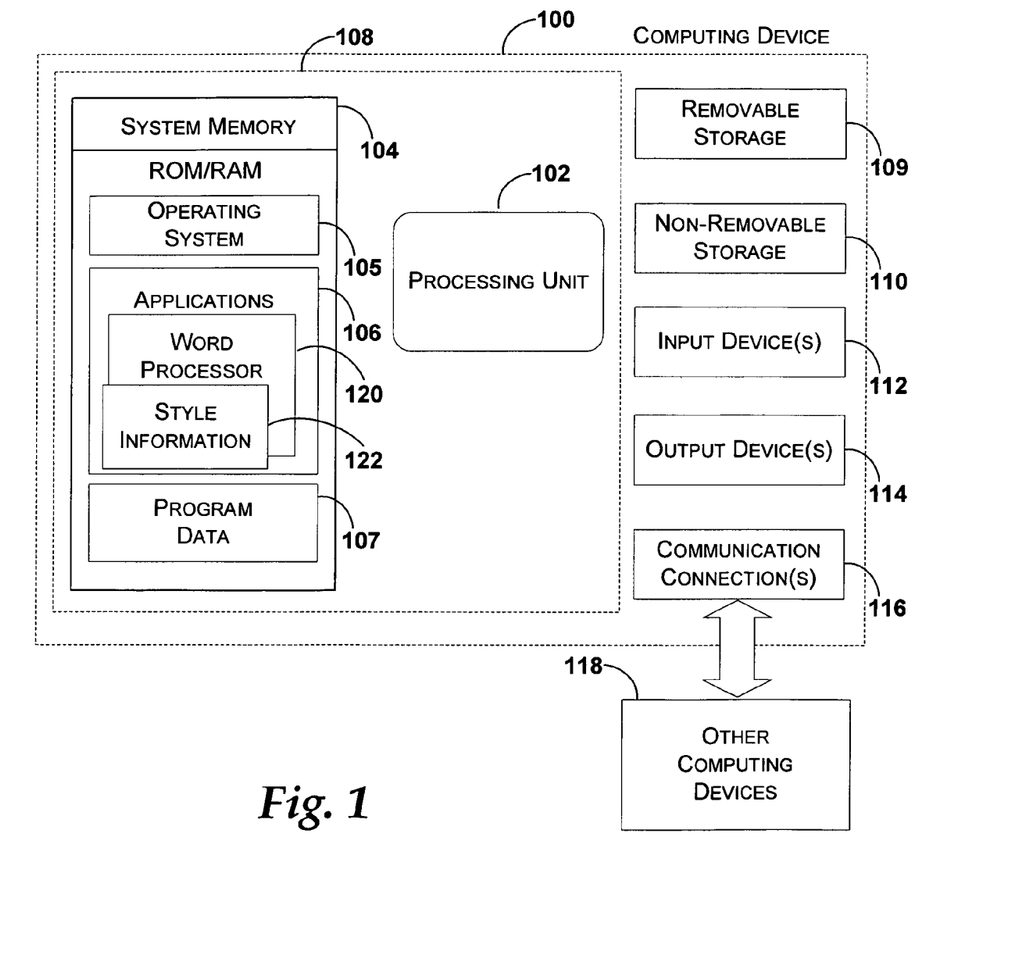
FIG. 1 illustrates an exemplary computing device that may be used in one exemplary embodiment of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a word-processor application 120 that further includes style information 122. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Generally, the present invention is directed at representing style information in an ML document. The ML document may be read by applications that do not share the same schema that created the document.

Figure 2:
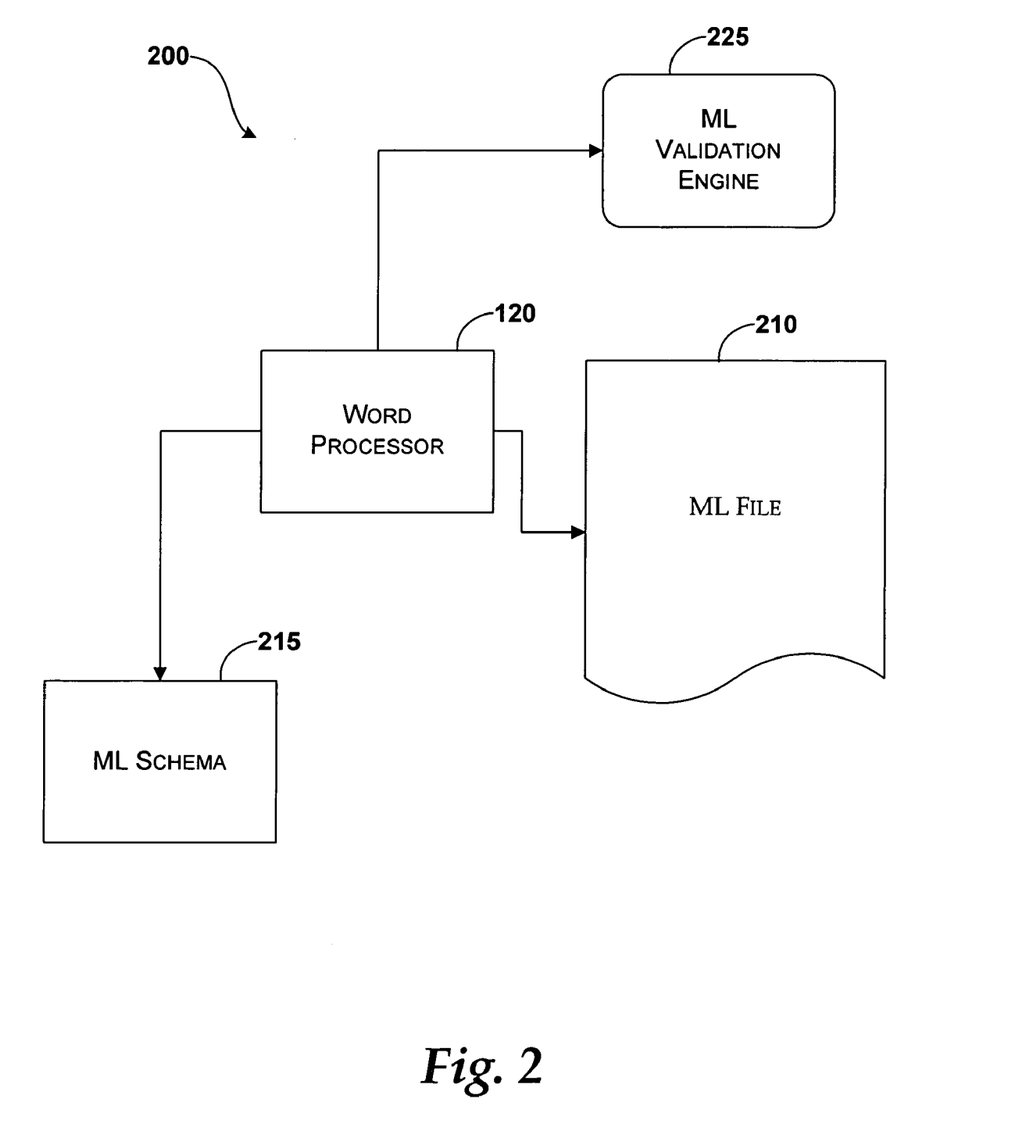
FIG. 2 is a block diagram illustrating an exemplary environment for practicing the present invention.

FIG. 2 is a block diagram illustrating an exemplary environment for practicing the present invention. The exemplary environment shown in FIG. 2 is a word-processor environment 200 that includes word-processor 120, ML file 210, ML Schema 215, and ML validation engine 225.

In one embodiment, word-processor 120 has its own namespace or namespaces and a schema, or a set of schemas, that is defined for use with documents associated with word-processor 120. The set of tags and attributes defined by the schema for word-processor 120 define the format of a document to such an extent that it is referred to as its own native ML. Word-processor 120 internally validates ML file 210. When validated, the ML elements are examined as to whether they conform to the ML schema 215. A schema states what tags and attributes are used to describe content in an ML document, where each tag is allowed, and which tags can appear within other tags, ensuring that the documentation is structured the same way. Accordingly, ML 210 is valid when structured as set forth in arbitrary ML schema 215.

ML validation engine 225 operates similarly to other available validation engines for ML documents. ML validation engine 225 evaluates ML that is in the format of the ML validation engine 225. For example, XML elements are forwarded to an XML validation engine. In one embodiment, a greater number of validation engines may be associated with word-processor 120 for validating a greater number of ML formats.

Representing Style Information in a Markup Language Document Styles may be applied to paragraphs, characters, tables, lists, and other structures within a document. An individual style may include a specified font size, bolding, orientation, indentation, color, and other formatting. In an ML file, the styles declarations are listed at the top, prior to the body of the document. The declarations set up the styles so that each style may be referenced by the different objects in the body of the document. In one embodiment, a root element "w:word-Document" allows a child element "w:styles" which stores the style definitions. The children of the styles element may include a version of a built in style, a latent style, and a custom style (e.g., a user generated style).

There may be a number of styles built in directly into a word processor application. These built-in styles are used by many of application's internal features. Since the styles are built in, the application may not be required to view the definition of the styles when the application opens a document, but it usually will. It is still possible for a user to change the appearance of a built in style, so it is usually necessary to look a the properties of the build in style when opening the file. If there is no definition though, the application knows how the built-in style should look.

However, future versions of the built-in style may change the name with which the style is referred. With the version number for built-in style names, the application knows whether a style is a built in style using an older version name, or if it is a custom style. If the style is one of the built in styles, but it's just using an old name, than the current application can change the name of the style and update all objects that are referencing that old name. An example of a use of this would be if in a new version there were an improvement made to Heading styles. With the improvement the name of Heading styles were changed. In order for old documents to still have their Headings treated as headings and not just custom styles, the version of built in style names is referenced. This is also useful in international scenarios where a built in style may be called something else in a different language (although this is not usually the case with built in styles).

The "style" element includes the definition of a particular style. Each style definition is included in it's own "style" element which is a child of the "styles" element. The style element includes a number of elements and attributes, of which some examples are described in the following table:

TABLE 1

| | |
|---|---|
| name | Primary name of style; built-in stylename are converted to a language-independent form |
| aliases | Secondary names of style, separated by commas |
| ref = "wx:uiName" | This is just a hint. It shows the name of the style as it appears in the UI |
| sti | Built-in style unique numerical identifier |
| basedOn | styleId name of style this style is based on |
| next | styleId name of the next-paragraph-style, only for paragraph styles |
| link | styleId of the linked style, only for linked paragraph and character styles |
| rsid | Revision Save Id for this style, a unique identifier to track when the style was last changed |
| @styleId | Name used to refer to this style within ML. Unique within the file. Otherwise unused. |
| pPr | Paragraph properties for the style, if any |

The elements associated with the "style" element each have a specific function associated with the "style" element. For example, the <name> element is used to show what a particular style is called when the style is shown in a word-processing application. The <name> element is different from the styleID (i.e., @styleId). The style ID is what the different objects in the document that are part of that style use to refer to the style. Typically, the styleID element is syntactically formed in accordance with CSS semantics (used in HTML documents), which is usually more restrictive than the rules of the application (e.g., a word processor or a spreadsheet). Using styleIDs with CSS-compatible semantics results in reduced parsing for the application when the application transforms the document into ML code.

Another example element is pPr element, or the paragraph element. The pPr element includes information on the paragraphs properties for the given style. The paragraph properties may include a variety of properties, of which some examples are described in the following table:

TABLE 2

| | | |
|---|---|---|
| listPr | [listPrElt] | List properties |
| supressLineNumbers | [onOffProperty] | Prevents line numbers from appearing next to paragraph. This setting has no effect in documents or sections with no line numbers. |
| pBdr | [pBdrElt] | Borders for the paragraph |
| shd | [shdProperty] | Paragraph Shading |
| tabs | [tabsElt] | Tab Stop List |
| suppressAutoHyphens | [onOffProperty] | Prevents automatic hyphenation |
| kinsoku | [onOffProperty] | Asian Typography: Use East Asian typography and line-breaking rules to determine which characters begin and end a line on a page. |
| wordWrap | [onOffProperty] | Asian Typography: Allows a line to break in the middle of a Latin word. |
| overflowPunct | [onOffProperty] | Asian Typography: Allows punctuation to continue one character beyond the alignment of other lines in the paragraph. If you do not use this option, all lines and punctuation must be perfectly aligned. |
| topLinePunct | [onOffProperty] | Asian Typography: Allows punctuation to compress at the start of a line, which lets subsequent characters move in closer. |

These properties add to the functionality provided for styles in ML, allowing the styles to be mapped to an ML file and substantially reproduced when parsed by an application.

As may be seen in the examples in FIGS. 3 and 4 below, unless a style is specified, a default style (e.g., normal) is applied. Usually, a style is based on a previous style included in the style definitions for the ML document. Most often a new style created is based on the normal style, meaning that new style inherits all of the properties from the Normal style, and then builds on those. It is also possible though to base a style on another style that already has the desired base appearances. This allows for an easy changing of the "theme" of the entire document, since all the styles can be based on one core style that can then be modified to affect the entire document's look.

Figure 3:
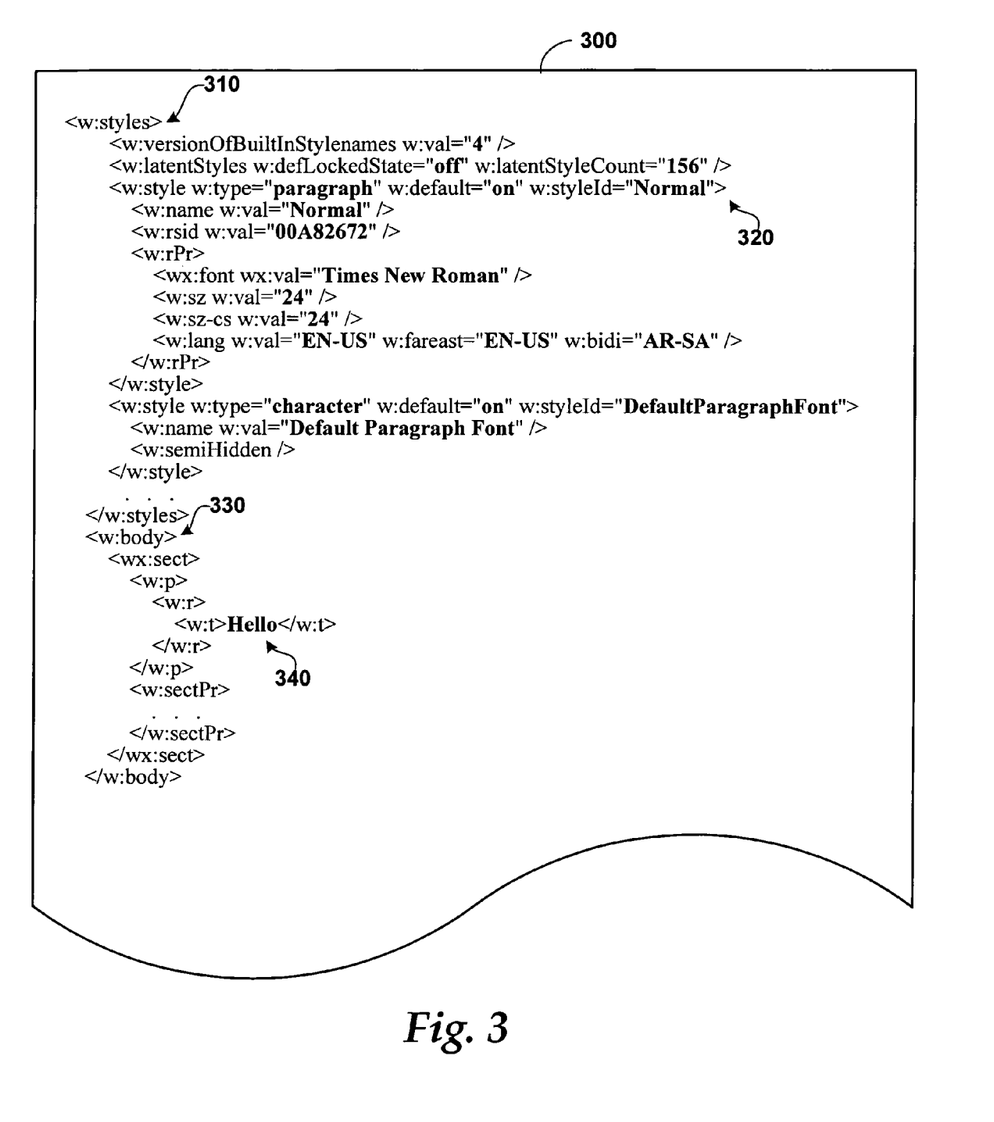
FIG. 3 illustrates an exemplary portion of an ML file that provides representation of a built-in style applied to a body of a document.

FIG. 3 illustrates an exemplary portion of an ML file that provides representation of a built-in style applied to a body of a document, in accordance with aspects of the present invention.

The example shown, illustrates a styles definition section 310 and a body 330 of the ML file 300. Styles definition section 310 includes a default built-in style "Normal" 320. The style is of type "paragraph" but may also be another type of style, such as table or list. Normal style 320 shown has associated elements such the rPr element that includes the character properties associated with the paragraph style. The result of the ML document is the typed word "Hello" 340, as shown the body 320 of the ML file 300. Since normal style 320 is the default style defined for the document, a reference to normal style 320 is not required in the body 320 of the ML file 300. Instead, the default style is automatically applied to text of the body 320. It is appreciated that a variety of styles may be associated with the ML file 300 along with a default style for each style type (e.g., a default table style).

Figure 4:
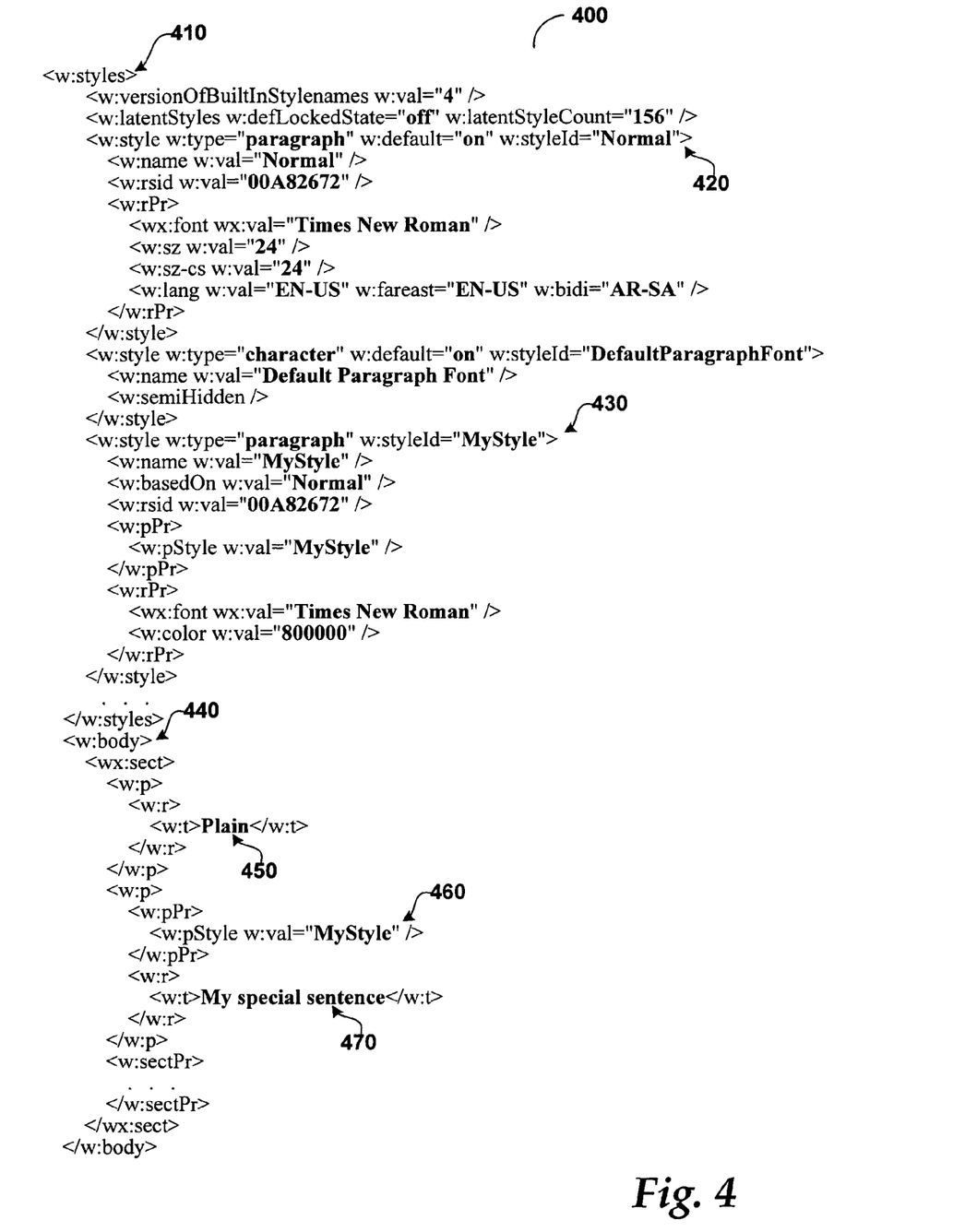
FIG. 4 illustrates an exemplary portion of an ML file that provides representation of a custom style applied to a body of a document.

FIG. 4 illustrates an exemplary portion of an ML file that provides representation of a custom style applied to a body of a document, in accordance with aspects of the present invention.

The example of FIG. 4 is similar to the example of FIG. 3 illustrating a styles definition section 410 and a body 440 of the ML file 400. In addition, the example of FIG. 4 includes custom style "MyStyle" 430 along with default built-in style "Normal" 420 defined within styles definition section 410, and additional result "My special sentence" 470 along with result "Plain" 450 in the body 440. A reference the body 460 to Mystyle 430 applies the custom style to the result that follows the reference. Other custom styles may be defined and applied to results within ML document 400. A variety of styles may be defined using the custom styles functionality of the present invention and applied to multiple results throughout a document.

Figure 5:
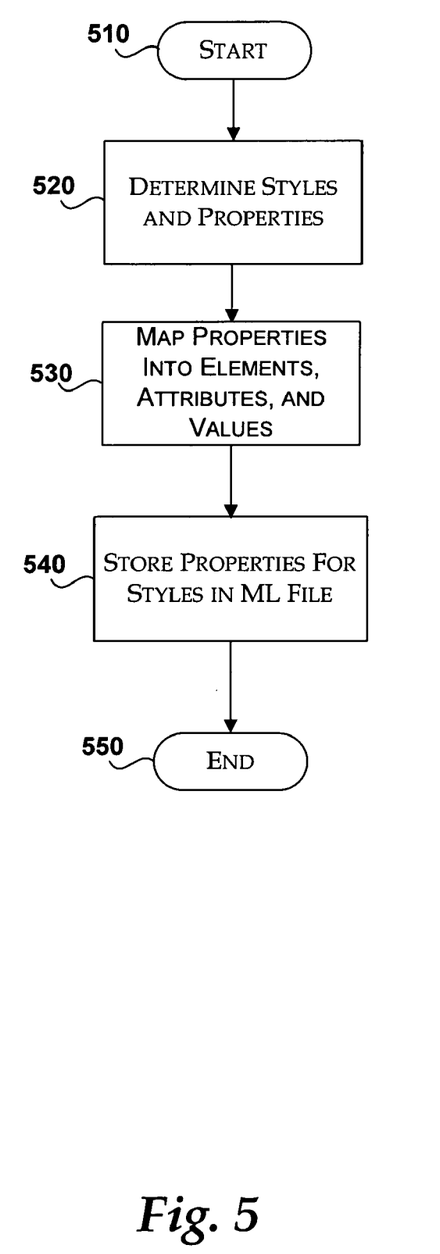
FIG. 5 shows an exemplary flow diagram for representing style information in a ML document, in accordance with aspects of the invention.

The following is an exemplary portion of schema for generating the styles in the ML document, in accordance with aspects of the present invention:

FIG. 5 shows an exemplary flow diagram for representing style information in a ML document, in accordance with aspects of the invention. After start block 510, the process flows to block 520 where the style information within a document such as a word-processor document, is determined. The style information used within a document may include many different types of styles such as paragraph styles, table styles, character styles, and list styles, including those that are not natively supported by later applications parsing the document. Once the style information is determined, processing proceeds to decision block 530.

At block 530, the properties of the styles within the document are mapped into elements, attributes, and values of the ML file. The styles and the properties associated with the styles may change from page to page, section to section, chapter to chapter and the like. There may be more than one mapping, therefore, per document. Once the style information properties are mapped, or written to the ML file, processing moves to block 540.

At block 540, the properties of the styles are stored in a ML document that may be read by applications that understand the ML. Once the properties are stored, processing moves to end block 550 and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for representing style information in a markup language document, comprising:
    at a computing device, internally representing an application document in a word-processing application, wherein the internal representation is in a non-markup language format that is native to the application and the internal representation comprises unique properties for describing styles within the document, wherein the unique properties are defined by the application;
    at the computing device, determining one or more unique properties corresponding to a style that relates to at least one section of the application document;
    at the computing device, mapping the determined properties of the style into at least one of a markup language element, an attribute, and a value; and
    at the computing device, storing the mapped properties of the style in the markup language document separate from the internal representation, wherein the markup language document is manipulable on a system including one of a server and another system configured to understand the markup language and to substantially reproduce the style without using the application that generated the markup language document and the style is not native to the system.

2. The method of claim 1, further comprising determining whether the style is one of a set comprising a paragraph style, a character style, a table style, and a list style.

3. The method of claim 2, wherein additional properties are associated with each of the set of styles such that the custom styles are generated by selected one or more of the additional properties.

4. The method of claim 1, wherein the style is categorized according to one of a set including a version of a built-in style, a latent style, and a custom style.

5. The method of claim 4, wherein a latent style comprises a style that is a built-in style not yet instantiated by an application.

6. The method of claim 1, further comprising:
    determining one or more unique properties corresponding to an additional style that relates to at least one section of the application document;
    mapping the determined properties of the additional style into at least one of a markup language element, an attribute, and/or a value; and
    storing the mapped properties of the additional style in the markup language document.

7. A computer storage medium for representing style information in a markup language document, said computer storage medium storing instructions for performing the following functions:
    internally representing a word-processing document in a word-processing application, wherein the internal representation is in a non-markup language format that is native to the application and the internal representation comprises unique properties for describing styles within the document, wherein the unique properties are defined by the application;
    determining one or more unique properties relating to a style used within the word-processing document;
    determining whether the style is one of a set including a paragraph style, character style, a table style, and a list style;
    mapping the properties into at least one of a markup language element, an attribute, and/or a value; and
    storing the properties in the markup language document separate from the internal representation such that the style is substantially maintained when the markup language document is parsed by an application, wherein the markup language document is manipulable on a system including one of a server and another system wherein the system is configured to understand the markup language and to substantially reproduce the style without using the application that generated the markup language document and the style is not native to the system.

8. The computer storage medium of claim 7, further comprising:
    determining properties corresponding to an additional style that relates to at least one section of the application document;
    mapping the properties of the additional style into at least one of a markup language element, an attribute, and/or a value; and
    storing the properties of the additional style in the markup language document.

9. The computer storage medium of claim 7, wherein additional properties are associated with each of the set of styles such that the custom styles are generated by selected one or more of the additional properties.

10. The computer storage medium of claim 7, wherein the style is categorized according to one of a set including a version of a built-in style, a latent style, and a custom style.

11. The computer storage medium of claim 7, wherein a latent style comprises a style that is a built-in style not yet instantiated by an application.

12. A system for representing styles in a markup language document, said system tangibly embodied on a computer storage medium and comprising:
    an application that is configured to:
        internally represent an application document in a word-processing application, wherein the internal representation is in a non-markup language format that is native to the application and comprising unique properties for describing styles within the document, wherein the unique properties are defined by the application;

determine one or more unique properties relating to a style included in at least one section of the application document;

map the determined properties into at least one of a markup language element, an attribute, and/or a value; and store the mapped properties in the markup language document separate from the internal representation, wherein the markup language document is manipulable on a system including one of a server and another system configured to understand the markup language and to substantially reproduce the style without using the application that generated the markup language document and the style is not native to the system; and a validation engine configured to validate the markup language document.

13. The system of claim 12, wherein the style is categorized according to one of a set including a version of a built-in style, a latent style, and a custom style.

14. The system of claim 12, further comprising:

determining properties corresponding to an additional style that relates to at least one section of the application document;

mapping the determined properties of the additional style into at least one of a markup language element, an attribute, and/or a value; and storing the mapped properties of the additional style in the markup language document.

15. The system of claim 12, wherein the properties of the style stored in the markup language document are understood by an application that understands the markup language when the style is not native to the application.

16. The system of claim 12, further comprising determining whether the style is one of a set including a paragraph style, a character style, a table style, and a list style.

17. The system of claim 12, wherein additional properties are associated with each of the set of styles such that the custom styles are generated by selected one or more of the additional properties.

* * * * *